(12) United States Patent
Boladian

(10) Patent No.: US 11,948,165 B2
(45) Date of Patent: Apr. 2, 2024

(54) APPARATUS FOR SERVICE ACQUISITION

(71) Applicant: BIDAH TECHNOLOGIES PTY LTD, Sydney (AU)

(72) Inventor: Ivan Boladian, Sydney (AU)

(73) Assignee: Bidah Technologies Pty Ltd, Sydney (AU)

( * ) Notice: Subject to any disclaimer, the term of this patent is extended or adjusted under 35 U.S.C. 154(b) by 0 days.

(21) Appl. No.: 16/643,180

(22) PCT Filed: Sep. 3, 2018

(86) PCT No.: PCT/AU2018/050950
§ 371 (c)(1),
(2) Date: Feb. 28, 2020

(87) PCT Pub. No.: WO2019/040998
PCT Pub. Date: Mar. 7, 2019

(65) Prior Publication Data
US 2020/0211042 A1    Jul. 2, 2020

(30) Foreign Application Priority Data
Sep. 1, 2017   (AU) ............................... 2017903535

(51) Int. Cl.
*G06Q 30/0201*   (2023.01)
*G06Q 10/02*   (2012.01)
(Continued)

(52) U.S. Cl.
CPC ......... *G06Q 30/0206* (2013.01); *G06Q 10/02* (2013.01); *G06Q 30/0284* (2013.01); *G06Q 30/0611* (2013.01); *G06Q 50/30* (2013.01)

(58) Field of Classification Search
CPC . G06Q 10/02; G06Q 30/0206; G06Q 30/0611
(Continued)

(56) References Cited

U.S. PATENT DOCUMENTS 10,963,848 B1 * 3/2021 Anderson .............. G06Q 20/08
2008/0208616 A1   8/2008 Young
(Continued)

FOREIGN PATENT DOCUMENTS

| WO | WO-2012012427 A1 * | 1/2012 | ............. G06Q 30/02 |
| WO | WO-2012159038 A2 * | 11/2012 | ............. G06Q 30/06 |
| WO | WO-2013095528 A1 * | 6/2013 | ............. G06Q 30/06 |

OTHER PUBLICATIONS

D. Chakraborty et al., "Businessfinder: harnessing presence to enable live yellow pages for small, medium and micro mobile businesses," in IEEE Communications Magazine, vol. 45, No. 1, pp. 144-151, Jan. 2007. https://ieeexplore.ieee.org/document/4064637?source=IQplus. (Year: 2007).*

(Continued)

*Primary Examiner* — Jeff Zimmerman
*Assistant Examiner* — Hunter A Molnar
(74) *Attorney, Agent, or Firm* — Knobbe Martens Olson & Bear LLP

(57) ABSTRACT

Embodiments of this invention provide an adaptive marketplace in which customers can place a request for a service and vendors have an opportunity to make an offer to provide the service on behalf of the customer for a particular price. The service request and vendor management is handled by a systems engine. An apparatus is arranged to receive a customer request and identify at least one vendor suitable for satisfying the customer request. The system is arranged to determine a vendor compatibility score, which is dependent on the compatibility of the vendor to the customer request. An estimate is made of the probability of the vendor being selected to provide the customer request. The customer request, customer preferred reference price and the probability of the vendor being selected are provided to the vendor.

17 Claims, 4 Drawing Sheets

(51) Int. Cl.
   *G06Q 30/0283* (2023.01)
   *G06Q 30/0601* (2023.01)
   *G06Q 50/30* (2012.01)

(58) Field of Classification Search
   USPC .......................................................... 705/7.35
   See application file for complete search history.

(56) References Cited

U.S. PATENT DOCUMENTS

| | | | |
|---|---|---|---|
| 2009/0164383 A1* | 6/2009 | Rothman | G06Q 30/06 705/26.1 |
| 2014/0229258 A1* | 8/2014 | Seriani | G06Q 10/08345 705/14.23 |
| 2015/0095113 A1* | 4/2015 | Richards-Boeff | G06Q 30/0206 705/7.35 |
| 2016/0343051 A1 | 11/2016 | Hudson et al. | |
| 2017/0039634 A1 | 2/2017 | Yenisetty et al. | |
| 2017/0200321 A1* | 7/2017 | Hummel | G06Q 30/0611 |
| 2019/0355077 A1* | 11/2019 | Ahmed | H04N 5/23238 |

OTHER PUBLICATIONS

China Daily, "Why it's so hard to hail a taxi in China?", retrieved from the internet, http://www.chinadaily.com.cn/china/2017-01/25/content_28053783_3.htm, published Jan. 25, 2017, in 10 pages.

International Search Report and Written Opinion dated Dec. 12, 2018 in International Application No. PCT/AU2018/050950, filed Sep. 3, 2018, in 9 pages.

International Preliminary Report on Patentability dated Jan. 7, 2020 in International Application No. PCT/AU2018/050950, filed Sep. 3, 2018, in 6 pages.

* cited by examiner

APPARATUS FOR SERVICE ACQUISITION

CROSS REFERENCE TO RELATED APPLICATIONS

The present application is a U.S. national phase application under 35 U.S.C. § 371 of International Application No. PCT/AU2018/050950, filed on Sep. 3, 2018 and published as WO 2019/040998 A1 on Mar. 7, 2019, which claims priority to AU Application No. 2017903535, filed on Sep. 1, 2017. The content of each of these applications is incorporated herein by reference in its entirety.

The present invention relates to a method and apparatus for service acquisition and, in particular, to an engine for determining the suitability of particular vendors for providing a service and using pricing indices to present the probability of vendors procuring the service at various price points.

BACKGROUND

Online market places exist in which customers may request a particular service and vendors may offer to provide the service. Typically, pricing for a service is generated using a static pricing algorithm. Often, the specific details of the service request are not made available to the vendor to make an informed decision. Additionally, the customer requesting the service often has no input as to the accepting vendor, thereby limiting options and undermining control. Accordingly, preferences of the customer and vendor are rarely taken into account.

Typically, vendors operating within such market places are unable to determine the value for services in accordance with the specific requirements of the service and their real-time work circumstances.

Such market places operate in various industries including couriers, point to point taxis or ride sharing, cleaning and other services.

SUMMARY OF THE INVENTION

Embodiments of the invention provide a cloud based platform through which a customer device and vendor device can interact, in a targeted way. In embodiments, customer request attributes are made known such that a vendor device can determine the value it perceives a service as having, and a customer device is provided with at least one value and is enabled to choose from a set of such values.

SUMMARY OF THE INVENTION

In a first aspect the invention provides a method for notifying a vendor of a customer request comprising the steps of:
receiving a customer request for a service including at least one customer request criteria;
retrieving customer information;
identifying at least one vendor suitable for providing the customer request;
retrieving vendor information for at least one vendor;
for each of the at least one vendor determining a vendor compatibility score, the vendor compatibility score being dependent on the compatibility of the vendor to the customer request;
wherein for at least one of the identified vendors generating an adaptive vendor pricing index to estimate the probability of the vendor being selected to provide the customer request at at least one customer request reference price using the vendor compatibility scores, customer request information and retrieved customer information; and,
providing the customer request, at least one customer request reference price, and the probability of the vendor being selected to provide the customer request at the customer request reference price, to the at least one vendor.

Preferred embodiments comprise the further step of generating a customer score, the customer score being generated using at least one of customer information, and customer request criteria; and wherein the step of generating an adaptive pricing algorithm is performed using the customer score index. The customer score index generated for each customer request for service will then form part of the customer information, which will be used by the adaptive vendor pricing index for the subsequent customer request. This feedback loop will continue as such, and be continually revised on an ongoing basis.

In embodiments customer information includes at least one of:
preselected customer criteria associated with the customer, preselected customer criteria comprising customer preferences, previous customer score index attributes, and previous behaviours of the customer.

In embodiments vendor information includes at least one of:
preselected vendor criteria associated with the vendor, preselected vendor criteria comprising vendor preferences, and previous behaviours of the vendor.

Preferred embodiments comprise the further step of determining real time market metrics.

In embodiments real time market metrics comprises at least one of a comparison between supply and demand at the time of the customer request, geographical location of the customer request and at least one standard reference price.

In embodiments the step of generating a customer score, uses at least one of:
system generated capabilities; and
market metrics.

In embodiments the vendor compatibility score is determined using at least one of:
customer request information;
system generated capabilities;
market metrics; and vendor information.

System generated capabilities includes a machine learning algorithm that identifies correlations between various attributes theretofore unconsidered, to enhance the accuracy of the vendor compatibility score in generating the probability of the vendor being selected to provide a customer request at each customer request reference price.

In embodiments the step of generating the adaptive vendor pricing index is performed in dependence on a comparison of multiple vendor compatibility scores for the customer request.

In embodiments the vendor is a suitable vendor if it is located within at least one of: a predefined distance from the customer at the time of receiving the customer request, or a predefined distance from the service location defined in the customer request, or having its principal place of business a predefined radius from the service location defined in the customer request, or a server predefined radius from the customer, or the customer service request location.

In embodiments the probability of the vendor being selected is a percentage probability.

Preferred embodiments comprise the further step of receiving at least one offer price from at least one vendor, the offer price comprising the customer request reference price selected by the vendor at which the vendor will provide the customer request.

Preferred embodiments comprise the step of transmitting to the customer at least one offer price and vendor information relevant to the customer request.

In a second aspect the invention provides a method for notifying at least one vendor of a customer request for service comprising the steps of: receiving a customer request for a service; for at least one vendor, generating a probability of the vendor being selected to provide the customer request at at least one customer request reference price; and, notifying the vendor of the customer request and the probability of procuring the customer request at at least one customer request reference price.

In a third aspect the invention provides an apparatus for notifying a vendor of a customer request comprising:
Receiver for receiving a customer request for a service including at least one customer request criteria;
Processor for:
retrieving customer information from a database;
identifying at least one vendor suitable for providing the customer request;
retrieving vendor information for at least one vendor;
for each of the at least one vendor, determining a vendor compatibility score, the vendor compatibility score being dependent on the compatibility of the vendor to the customer request;
wherein for at least one of the identified vendors, generating an adaptive vendor pricing index to estimate the probability of the vendor being selected to provide the customer request at at least one customer request reference price using the vendor compatibility scores, customer request information and retrieved customer information; and,
providing the customer request, at least one customer request reference price, and the probability of the vendor being selected to provide the customer request at the customer request reference price, to the at least one vendor.

In a fourth aspect the invention provides an apparatus for notifying at least one vendor of a customer request for service comprising: receiver for receiving a customer request for a service; processor, for at least one vendor, for generating a probability of the vendor being selected to provide the customer request at at least one customer request reference price; and, transmitter for notifying the vendor of the customer request and the probability of procuring the customer request at the at least one customer request reference price.

BRIEF DESCRIPTION OF THE DRAWINGS

An embodiment, incorporating all aspects of the invention, will now be described by way of example with reference to the accompanying drawings in which.

DETAILED DESCRIPTION

Embodiments of the present invention provide an adaptive market place in which customers can place a request for a service and vendors have an opportunity to make an offer to provide the service on behalf of the customer for a particular price. The service request and vendor management is handled by an engine.

Figure 1:
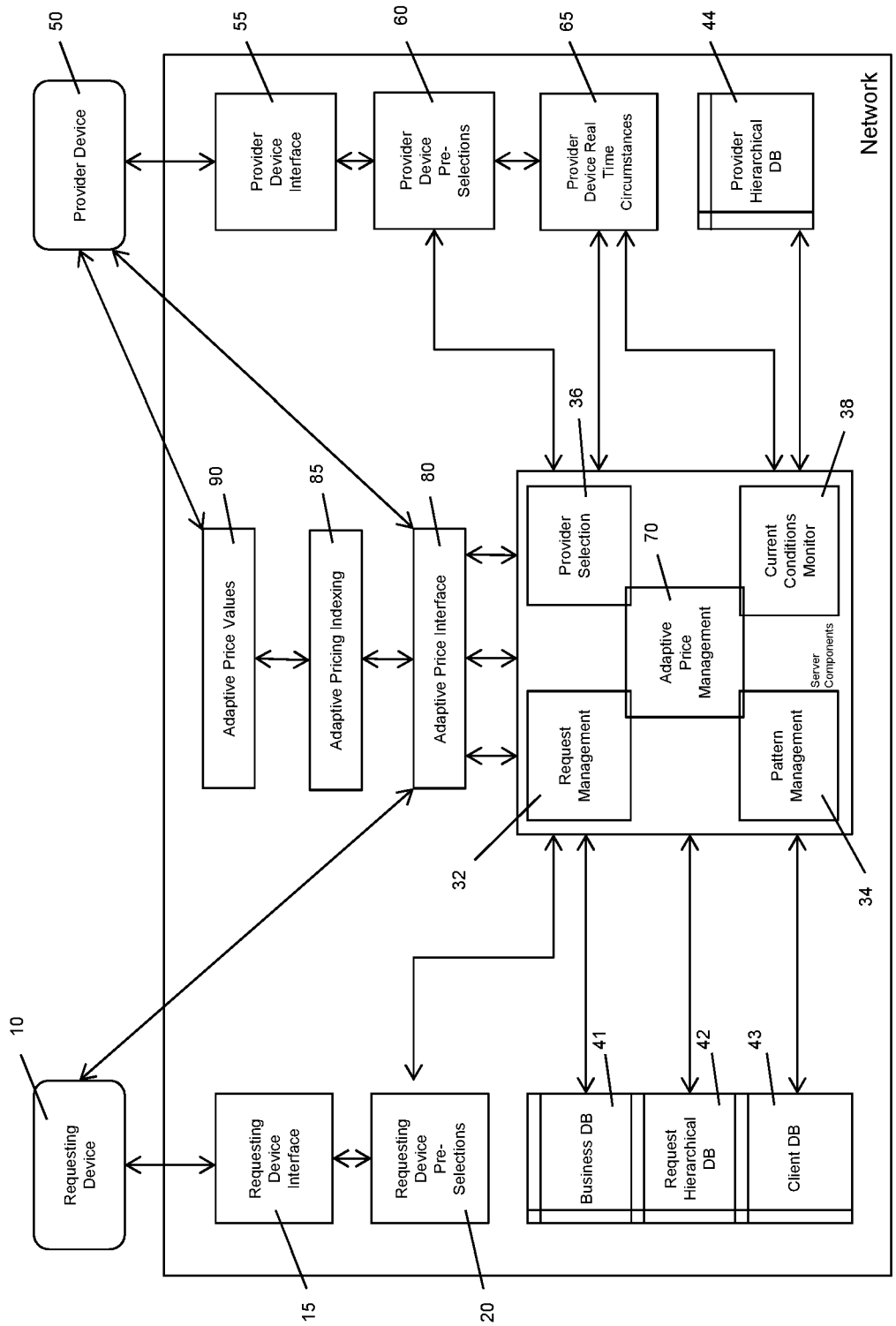
FIG. 1 shows the architecture in an embodiment.

FIG. 1 illustrates the architecture of the invention and outlines the interaction between devices, databases and functional engines within the network. Data is stored in databases which interact across the network in order to execute an Adaptive Price Indexing function.

The workflow begins with a customer device 10 posting its Service Details. This is received by the Requesting Device Interface 15 and then filtered through the Requesting Device Pre-selections 20. The work flow is received by the Request Management Server 32 and further filtered by the Pattern Management Server 34 which draws information from stored data existing in the Business database 41, Request Hierarchical database 42, and Client Databases 43.

The Vendor Device 50 exists at the opposite end of the work-flow. The Vendor Device 50 connects to the Vendor Device Interface 55, which filters through to the Provider Device Pre-selections 60. It is further filtered through to the Provider Device Real Time Circumstances 65, and then received by the Provider Selection Server 36. The Provider Selection Server then further refines its information through the Current Conditions Monitor 38, and then again with stored data existing in the Provider Hierarchical Database 44.

The Adaptive Price Management Server 70 receives all information derived from the above work-flows. The Adaptive Price Interface 80 is facilitated by the Adaptive Price Management Server 70, which information then flows through the Adaptive Price Indexing function 85 of the Network. The Adaptive Price Indexing function then provides Adaptive Price Values 90, which are then transmitted to the Provider Device 50, as an invitation to determine its own value with regard had to the Service Details which are also transmitted.

The Provider Device 50 is then prompted to select a value of the Adaptive Price Values it is displayed. In some embodiments, an alternative option is non-selection, whereby the work-flow will end. Should a selection be made, such selection is received by the Adaptive Price Interface 80. The Adaptive Price Interface will then transmit values, together with the corresponding Provider Device attributes of the service, to the Requesting Device for selection of a Provider Device.

The Provider Device that is chosen by the Requesting Device will then receive a prompt that their determined value has been accepted. Following such, they will be made available the full service details and carry out the service request.

Embodiments of the above system are implemented for multiple service types. For example, in the embodiment of a ride sharing platform, including all forms of both private and public transport, the service details are the pick up and destination points for a trip along with any passenger requirements. In the embodiment of a courier service, the service details are the pick up and drop off points along with the details of the package for delivery.

In the embodiment of airline flight sales, the service details include the class of travel, destination, and relevant dates. In the embodiment of a babysitting service, the service details include the age of the child, home location, and amount of time the service is required. In the embodiment of a cleaning service, the service details include the size of the property along with any specific issues to be attended to. In the embodiment of a copywriting, proof and/or editorial service, the service details include the amount of words of the subject text, and the amount of time it is required in. In the embodiment of a decorating service, the service details include the size of the room/residence to be decorated, and the event type it is required for. In the embodiment of a disc jockey service, the service details include the venue, and amount of time the service is required. In the embodiment of an electrical service, the service details include the maintenance work to be carried out. In the embodiment of an errand service, the service details include the errand to be carried out and the time frame it is to be carried out in. In the embodiment of a hair salon service, the service details include the current hair type and an outline of the services to be carried out. In the embodiment of a handyman service, the service details include the work to be carried out. In the embodiment of private/group holiday packages the service details include the destinations to tour, along with a time frame, particular attractions, preferred length of tour, and other relevant details. In the embodiment of a hotel, hostel, serviced apartment, boarding house, shared house, shared office, or similar, the service details include the number of people, and length of stay. In the embodiment of an insurance marketplace, the service details include any number of queries relevant to the insurance sought (home insurance, contents insurance, car insurance, travel insurance, boat insurance, life insurance, landlord and renters insurance, business insurance, caravan insurance, public liability insurance, pet insurance, motorbike and scooter insurance, bicycle insurance, sports insurance, farm insurance, personal items insurance, flood insurance, lenders mortgage insurance (LMI), and consumer credit insurance (CCI)). In the embodiment of a lawn mowing service, the service details include the length of the grass, and the size of the lawn. In the embodiment of a landscaping service, the service details include the desired work to be carried out. In the embodiment of a massage service, the service details include the type of massage to be carried out, and the amount of time it is required for. In the embodiment of a moving service, the service details include the size of the house/household items, and the distance between the outgoing and incoming residence. In the embodiment of a painting service, the service details include the size of the wall(s) to be painted, colour and paint type. In the embodiment of a personal chef service, the service details include the food to be cooked, the number of guests and the venue location. In the embodiment of a pest control service, the service details include the size of the residence/office to be sprayed, and the current problem to be attended to. In the embodiment of a pet care service, the service details include the pet type, size, and treatment to be carried out. In the embodiment of a photography service, the service details include the event the service is required for, and the amount of time the service is required. In the embodiment of a plant maintenance service, the service details include the plant types, and the number of plants to be serviced. In the embodiment of a plumbing service, the service details include the service location, and the plumbing maintenance issue to be attended to. In the embodiment of a pool cleaning service, the service details include the size and current state of the pool to be serviced. In the embodiment of a private investigation service, the service details include the location of the person(s) to be investigated, the issue to be investigated, and the amount of time it is required. In the embodiment of a building/property inspection service, the service details include the size of the property, and any known issues/concerns. In the embodiment of a security service, the service details include the number of people at the given event, the event location, and the amount of time the service is required for. In the embodiment of a senior care service, the service details include the ailments of the senior, location of residence, and the amount of time the service is required. In the embodiment of a labour hire service, the service details include the work that is required to be carried out, and the amount of time the service is required. In the embodiment of a spray tanning service, the service details include the service location and the amount of people the service is required for. In the embodiment of a tutoring service, the service details include the educational level of the person that requires the service, the subjects required to be taught, and the amount of time the service is required for. The service details above are noted to give context to each embodiment, and does not limit the service details that the apparatus requires of the customer.

Figure 2:
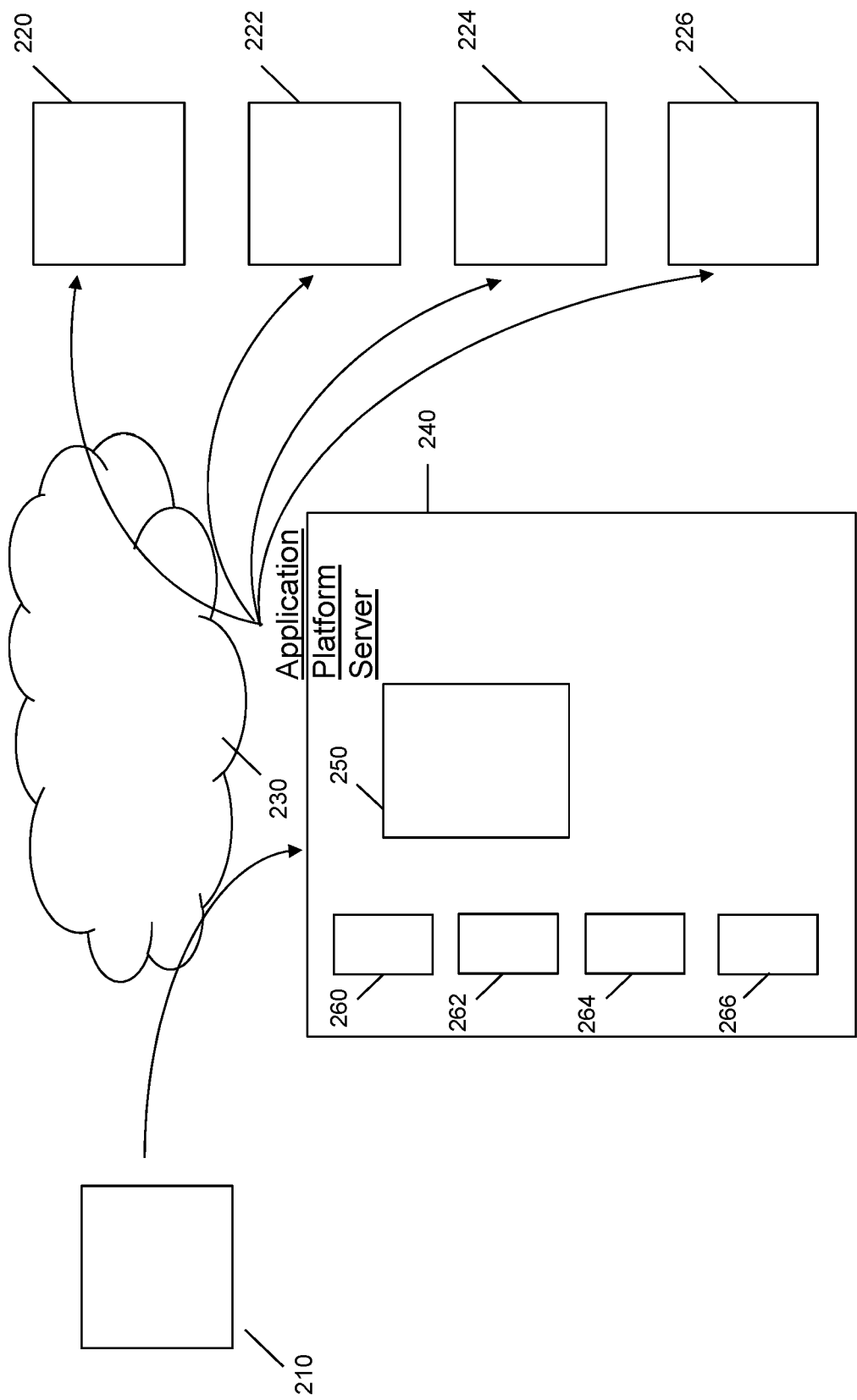
FIG. 2 shows interaction between components in an embodiment.

The interaction between the customer, vendor and application platform server is now described with reference to FIG. 2. FIG. 2 shows a customer device 210, vendor devices 220, 222, 224, 226 and a network application platform server 240. Customer device 210 and vendor devices 220, 222, 224, 226 communicate with the network server 240 over network 230. Network 230 may be a wireless network, for example a mobile communications network, a wired network, for example LAN or any other type of communications network. In some embodiments customer device 210 or vendor device 220, 222, 224, 226 may be co-located with the server 240.

Platform server 240 provides functionality to receive service requests from customer 210 and provide customer request information to a number of vendors along with pricing options. Pricing options are provided to each vendor along with a calculated probability of the vendor procuring the customer request at each given price. The prices and the probability of procuring the customer request are calculated independently for each vendor depending on specific circumstances including customer information, vendor information, real-time market metrics, and previous behaviours of the customer and/or vendor.

The calculations are conducted by engine 250 located at application server platform 240. Engine 250 retrieves information relating to the customer, vendor, market metrics and previous behaviours from databases 260, 262, 264, and 266.

On receipt of customer request information, pricing options and the probability of procuring the customer service request at different prices, a vendor may offer to provide the customer service request for a selected price. Offer prices are collected by application platform server 240 and presented to customer 210 together with information relating to the vendor. The customer may then accept a vendor to provide the service for the offered price.

Embodiments of the invention provide a cloud based platform through which a customer and vendor can interact in a targeted way. All attributes relating to the request and parties are made known such that a vendor device can determine the value it perceives a service request as having. Additionally, the requesting device is enabled to select from a set of vendor offers.

Figure 3:
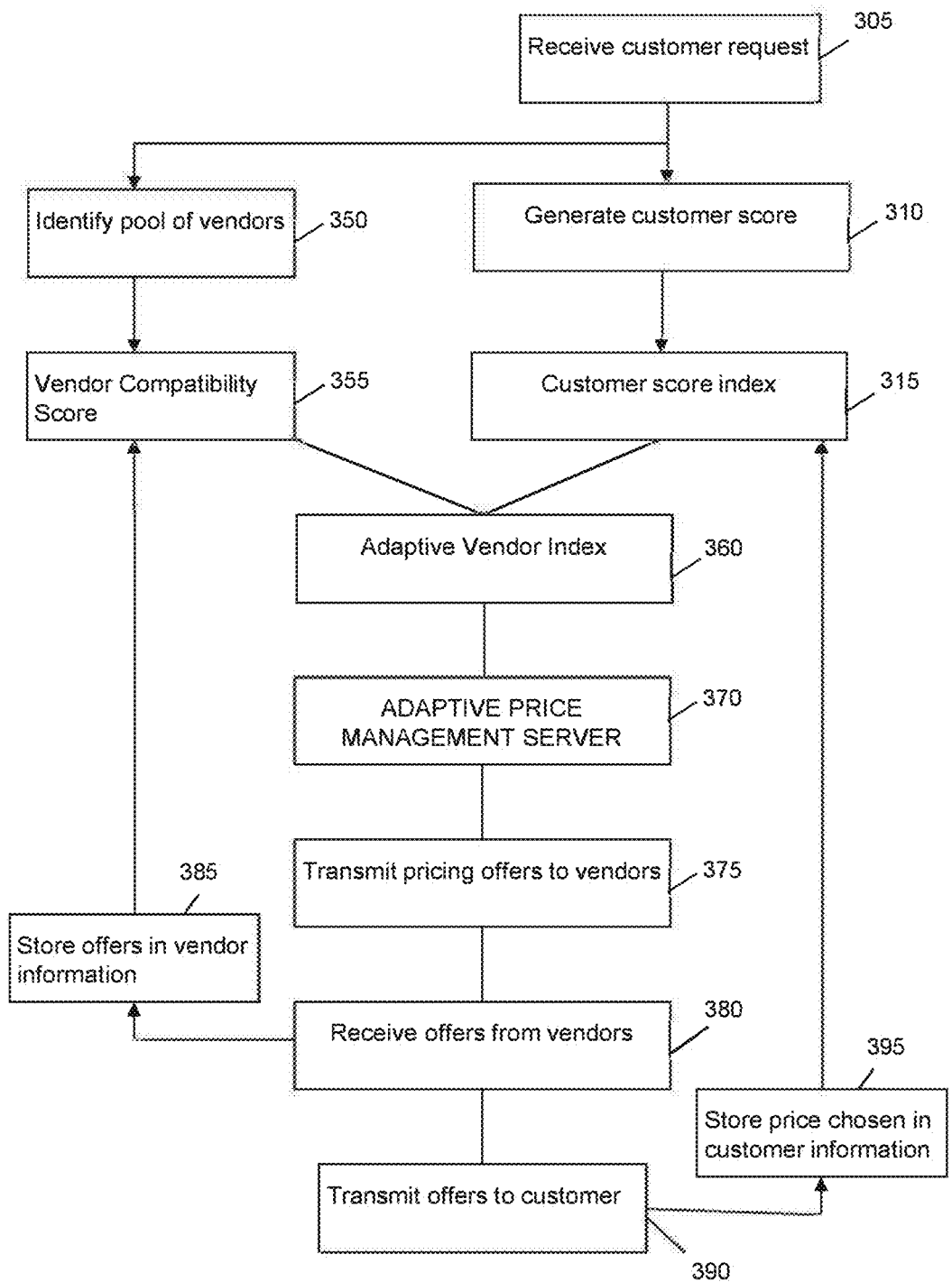
FIG. 3 is a flow diagram showing steps taken in an embodiment.

A detailed description of an example embodiment is now described with reference to the flowchart of FIG. 3. At 305 a customer request is received at application platform server 240. The customer request includes request information defining the service required by the customer. Depending on the application and service required, the customer request may include different and specific information. For example, in the situation where the user wishes to request a taxi ride, the customer request information would include at least the pickup address, destination, estimated trip time, and estimated time to pickup location. In a further example where the customer request is for a trade service, the customer request information may include customer location, or the location of the property requiring maintenance, and a description of the required service, for example plumbing, electrical, cleaning, etc. Upon receiving the customer request the platform server 240 conducts an assessment of the customer situation in the form of a customer score. The customer score is generated using a combination of the customer request information, system capabilities, customer information and real-time market metrics. The customer request information is described above. System capabilities include the correlation between variables that the system, through machine learning, deduces as relevant for future service requests, from past service requests, in a general sense, and without reference to the personal circumstances of the vendor or the customer.

Market metrics include real-time factors, for example the time of day, whether the request is made during a peak period, the supply to demand ratio, and the availability of vendors. Further market metrics may include other relevant factors, for example the weather conditions if relevant to the service. Market metrics also include standard pricing for the relevant service, known as a rate card. Standard pricing includes, for example for a ride sharing application the cost per kilometre, and per minute. These costs may vary for different vehicle types, for example standard, taxi cab, luxury, and SUV. For a cleaning application the rate card may include price per square metre, it may be dependent upon the equipment available to the particular vendor, or different pricing for different property types. Rate cards for other embodiments may be determined by assessing the capital machinery at the disposal of the relevant vendor, and their user rating.

The customer score is generated with reference to each of the customer request information, system capabilities and market metrics and generates a particular score associated with the specific requirements in the current market place.

At 315 a customer score index is generated. The customer score index generates a specific index score for the service, personalised using customer information. The customer score index is a personalised adaption of the customer score. The customer score index is created by adjusting the customer score using specific customer information. Customer information includes information that the system holds or is aware of which relates to the customer. Customer information also includes preselected customer criteria, for example preferred service providers, or preferred types of service providers, and previous transactional history including service requested and procured at the relevant prices. The application of this personalisation to the customer score may move the index score for the service up or down.

The combination of the customer score with the personalised customer information is used to generate a customer score index for the specific service, for that specific customer, at that specific time.

Additionally, an assessment of potential vendors is conducted. This process may be conducted in parallel with the process for generation of the customer score index, or before or after that process.

The pool of potential vendors is identified from the system database of registered vendors at 350. For particular embodiments, the pool of vendors may be generated based on proximity of vendors to the location of the requested service, for example in the case of a ride sharing and courier service it will be the pickup point, and for other embodiments such as cleaning, plumbing, electrical maintenance, or a senior care service, among other things, it will be the location that the service is to be carried out.

For each of the identified vendors, a vendor compatibility score is calculated at 355. The vendor compatibility score is generated based on the compatibility of the vendor to the customer request and to the customer. The vendor compatibility score is generated using a number of factors including:

Customer request information (as described above, including customer information);
Vendor information including previous behaviours of the vendor and preselected vendor criteria including vendor preferences;
System capabilities (as discussed);
Market metrics (as discussed above).

Vendor information may include previous performance of the vendor, the rating provided by customers, previous vendor behaviours, and other real-time vendor related information. For example, certain vendors may prefer only to provide a certain number of services within a predefined period, for example a 24-hour period, or a week. In some cases, the number of services provided by a vendor may be taken into account, for example if a vendor who has not secured a service in a predefined time period may be scored more preferentially compared with vendors who have already completed multiple services within that same time period.

At 360 the vendor compatibility scores of multiple vendors are compared. Since the vendor compatibility score is specific to the vendor, the customer service request, the compatibility of the vendor and the customer, and the real-time vendor circumstances, the vendor compatibility scores are specific to each vendor.

The comparison of the vendor compatibility scores assesses the likelihood of each vendor procuring the service at an equal price point. For example, a vendor having a high vendor compatibility score indicates that the vendor is more likely to procure the service if that vendor offers to provide the service at the same price point as a vendor having a lower compatibility score. The comparison of vendor compatibility scores, and collection of these scores at 360, represents the adaptive vendor pricing index methodology.

At 370 the adaptive vendor pricing index including the various scores for different vendors is combined with the customer score index at an adaptive price management server 370. The adaptive price management server generates for each vendor a functional relationship of the likelihood of each vendor procuring the customer service request at different prices. The adaptive price management server applies the customer score index to each of the vendor compatibility scores in order to identify the likelihood of each vendor procuring the service at various prices.

As discussed above, the adaptive price management server works on the basis that if all vendors offer to procure the job at the same price the vendor with the highest vendor compatibility score is most likely to procure the service. The adaptive price management server determines for each vendor the likelihood of procuring the service at different prices. Note that the customer reference prices transmitted to each of the pool of vendors will vary (based on factors such as estimated time to pickup location, car type, etc., although the underlying basis of the concept remains that, should the customer reference prices transmitted to the whole pool be equal, the vendor with the highest vendor compatibility score will be most likely to procure the service request. The different prices and probabilities are collated for each vendor.

At 375 the server transmits details of the customer service request, along with various customer request reference prices, and the probability of the vendor being selected to provide the service at each of the customer request reference prices, to each of the vendors. The prices and probabilities may be presented to the vendors in multiple different ways. In one embodiment, for each vendor three prices are transmitted along with a corresponding probability of procuring the service at each of the three prices. In further embodiments the application may allow a vendor to offer a different proposed price for providing the service. In such embodiments, the server may generate a probability associated with that proposed price, using information drawn from previous components in the workflow, and provide this to the vendor for consideration. In a slight variation to the latter embodiment, the space in which a vendor may propose a price may include a price recommended by the server and existing in the probability of procurement range of, for instance 70-99%, which price the vendor may increase or decrease in accordance with their preferences, and which will cause the probability to increase or decrease accordingly.

Limited information around the customer request may be provided, for example the general location of the service (for geo-locational privacy reasons) or the type of service provided. More specific information may be provided, depending upon the service request type and the need for disclosure of such information in informing the vendor such that a price reflective of the service parameters may be confidently selected.

The vendor is able to respond to the server with an offer to the customer by selecting the price at which they offer to carry out the service. Non-selection of a price will constitute a rejection of the service request. Offers from vendors are received at 380.

In some embodiments the offers, or the non-selection of an offer price, received from a vendor is stored in databases associated with the vendor. This information is stored to monitor vendor behaviour, and used for consideration in future transactions. At 385, this is demonstrated by the subsequent use of offer prices selected/not selected in determining the Vendor Compatibility Score for the next service request, creating an ongoing feedback loop.

At 390, the offers are transmitted to the customer for consideration and acceptance. In embodiments, information relating to the vendor may also be provided to the requesting customer. The customer may select one of the vendors to proceed with, at the corresponding price, for the vendor to carry out the service.

In some embodiments the prices chosen, or the non-selection of an offer price, from a customer is stored in databases associated with the customer. This information is stored to monitor customer behaviour, and used for consideration in future transactions. At 395, this is demonstrated by the subsequent use of offer prices selected/not selected in determining the Customer Compatibility Score for the next service request, creating an ongoing feedback loop.

Ride Sharing Application

A specific implementation of a ride sharing application in which the application platform server facilitates pricing indices related to ride sharing is now described, with reference again to FIG. 3. In the embodiment, the customer requests a ride to a particular location.

Vendors are drivers registered to provide ride sharing services within the application platform server. In this embodiment both the customer and vendors are registered with the ride sharing application which is facilitated by the platform server.

At 305 the registered customer opens the ride sharing application on a device to request a trip. Typically, the ride sharing application is loaded onto the customer device. The customer request includes customer request information including a number of parameters including:

Customer device geolocation;
Customer ID including for data to be referenced from the databases. This may be a specific device ID;
Pickup point;
Destination;
Whether number of passengers exceeds 4: If >4, then only SUV, if below, then all car types, or as pre-selected (as explained below);
Optionally, requested car type (standard, taxi cab, SUV, luxury);
Optionally, whether the customer would prefer a ride with the shortest estimated time of arrival to the pickup point, a ride at the cheapest price regardless of time of arrival (but not exceeding a server predefined maximum wait time), or a pre-booked ride to be carried out at a future time.

In further embodiments additional information may be provided.

The customer request information is transmitted to the application platform server over a communication network. As discussed above, the communication network may be a wired network or a wireless network. In further embodiments the customer device and input may be physically co-located with the application platform server.

The application platform server uses the specific customer ID to identify the customer making the request. Additionally, if the customer has logged in to the application then the customer may be identified by other identification protocols. The specific customer information for the present example is included in Table 1.

We now describe the process of calculating the Customer score.

TABLE 1

Trip details received from customer device.

|  | Customer Request Information | Customer score Contribution |
|---|---|---|
| Customer ID | 1234567 | N/A |
| Pick up point | 100 Miller Street, North Sydney, NSW 2060, Australia | 0 |
| Destination | Sydney International Airport | +20 |
| Distance | 13.2 km | +40 |
| Car Type | No preference | 0 |
| Number of Passengers | 1 | 0 |
| Pick Up Time/Cheapest Price | As soon as possible | +20 |

At 315 the system identifies the request from the customer and retrieves relevant market metric information. Market metric information is retrieved from servers from databases within the application platform server. The market metric data includes information related to the current market conditions. The market metric data includes specific information relevant to the market place at that current point in time. Market metric data is shown in Table 2 and includes:

Request time 5.45 pm, confirmation that the time is currently on peak, the weather conditions being sunny, confirmation that five vendors are within a 4 km radius of the customer pick up location, the fact that all five vendors are taxi cabs and thereby giving due consideration to the market metered price of such a service, and the fact that two other customers have requested rides within the proximity of the customer.

TABLE 2

Market metrics

| Market Metric Parameter | Current Conditions | Customer score Contribution |
| --- | --- | --- |
| Time | 5.45 pm | 0 |
| Weather | Sunny | 0 |
| Peak Hour? | Yes | +100 |
| Number of Local Vendors | 5 | |
| Number of Local Requesting Customers | 2 | |
| Local Supply/Demand | Over supply | −20 |

TABLE 3

Rate card for ride sharing application

| Car Type | Price Per Kilometre | Fixed Costs | Customer score Contribution |
| --- | --- | --- | --- |
| Standard | $3 | $4 | 0 |
| Taxi Cab | $4 | $5 | +40 |
| SUV | $6 | $8 | +80 |
| Luxury | $7 | $8 | +100 |

The system also retrieves a rate card. The rate card includes a standard charge for different types of vehicles. The rate card for the present example is shown in Table 3.

The rate card is used to determine the price of a standard fare for each particular car.

Application platform server generates a customer score using information from the customer request information, system capabilities and market metrics. Each of the components of the customer request information, system capabilities and market metrics contributes to the customer score. The contribution of each component to the overall customer score is shown in Tables 1, 2 and 3.

The calculation of the customer score is now described. In the present embodiment the customer score is initially set at 1000 and each of the contributing components is provided in combination with the initial score to generate the customer score. The customer score is, essentially, a score representing the current trip. The customer score is calculated as follows:

Customer Score=1000
Customer request information/Market metrics
=0 (100 Miller Street, North Sydney—pick up)+
=20 (Sydney International Airport—destination)+
=40 (13.2 km—distance)+
=0 (no preference—car type)+
=0 (1—number of passengers)+
=20 (as soon as possible/cheapest—pick up time)+
=0 (5.45 pm—time)+
=0 (Sunny—weather)+
=100 (yes—peak hour?)+
=−20 (local supply/demand)
=1160 (Total)

The customer score is the score associated with the current trip in the current market conditions and has a value of 1160.

We now describe the process of calculating the Customer score index:

At 315 the customer score index is calculated by a combination of customer score and the customer information. Customer information includes further information related to the customer, for example customer preferences and previous behaviours of the customer. Table 4 includes customer information and the contributing factor of the customer information to the customer score.

TABLE 4

Customer information

| Customer Information Type | Specific Customer Information | Customer score Contribution |
| --- | --- | --- |
| Preferred vendor | Prefers vendor X who is within predefined geo-locational range | +100 |
| Sex of customer and vendor | Customer is female, and female vendor(s) within predefined geo-locational range | +80 |
| Common evening destination | Workplace to home | +20 |
| Common morning location | Home to workplace | +20 |

Each of the components of the customer information is combined with the customer score to generate a customer score index.

Calculation of Vendor Pricing Index

The system also generates an adaptive vendor pricing index, which transmits information to the adaptive price management server, which then produces the probability of a particular vendor being selected to provide the requested service at a particular price point. These steps may be performed before, after or simultaneously with the generation of the adaptive customer index.

Initially, registered drivers located within a predefined distance of the customer pickup are identified. This identification was performed as part of the determination of market metrics in order to determine local supply and demand. For each of the identified drivers, vendor information is retrieved from the driver database. Vendor information includes preselected vendor criteria including vendor preferences and previous behaviours of the driver. Further information related to the drivers includes information related to the driver and any relevant limitations on work load for the driver.

In order to target a provider device effectively, drivers will be prompted to pre-select preferences. Such pre-selections are not mandatory. Such preferences will be evaluated by the system in the way that it targets each individual provider device. These pre-selections include, but may not be limited to:

1. Preferred distance range (e.g. 10-30 km) to be traveled in each given ride post
2. Preferred distance (e.g. 240 km) to be traveled in each given shift
3. Preferred number of hours to be worked in each given shift (cannot exceed a server predefined number of hours per day)
4. Preferred gross revenue to be made in each given shift (cannot exceed a server predefined daily rate)
5. Preferred destination points (multiple, e.g. home, favourite lunch destination, friend's house, family's house, place in which an errand needs to be carried out, and any other location type desired)

The vendor's real time circumstances will also be retrieved from the system as part of the vendor information. The following attributes will be evaluated and determined:

1. Whether a requesting device's destination is preferred by a provider device: if so, then the Vendor Compatibility Score will be weighted higher. If not, then no higher weight allotted.
2. The aggregated average idle time between trips for the past 4 hours is >20 minutes (or a different server pre-defined parameter): if so, then the Vendor Compatibility Score will be weighted higher. If not, then no higher weight allotted.
3. Distance traveled by a provider device in that given shift: if >30 km per hour is remaining in a given shift per day, then a higher Vendor Compatibility Score will be allotted, if not, then no additional points are allocated. By way of example, if a vendor pre-selects 240 km to drive in an 8-hour shift, and there are 3 hours remaining, with only 140 km traveled in that shift (with 100 km remaining), then the Vendor Compatibility Score will be weighted higher. If not, then no higher weight allotted.
4. The preselected preferred ride distance that the provider device has inputted (as explained above): If the particular ride comes within this pre-selected parameter, then the Vendor Compatibility Score will be weighted higher. If not, then no higher weight allotted.
5. Provider device car type: 1 luxury, 1 SUV, 1 taxi, several standard car types to be displayed to the requesting device (unless >4 passengers, in which case, only SUV, or unless a car type has been pre-selected by the requesting device, as explained above). Superior car types will attract a higher Vendor Compatibility Score, together with any pre-selected car types. If this does not apply, then no higher weight allotted.
6. Bi-directional ratings: Vendors with >75% positive rating will be weighted higher with respect to the Vendor Compatibility Score than vendors with <75% positive ratings.

Again, each of the vendor information is allocated a particular contribution to the Vendor Compatibility Score.

In addition to the vendor information, the customer request information is retrieved and used to contribute to the Vendor Compatibility Score. System capabilities are also retrieved along with the market metrics, and also contribute to the score.

The customer request information, vendor information, system capabilities and market metrics are combined to calculate a vendor compatibility score for each specific driver.

Calculation of Vendor Compatibility Score:

The following description describes how the vendor compatibility score is generated. An important part of the generation of the vendor compatibility score is the compatibility of the vendor with the particular customer request information. For example, as discussed above, a driver for which the distance of the customer request is within a preferred distance range for a driver may gain a heavier weighting that the driver for which the distance of the trip falls outside of preferred distance range. A female driver may be provided with a greater vendor compatibility weighting compared with a male driver for a trip request by a female customer.

Table 4 includes the contributing factors to the vendor compatibility score for four different drivers (Drivers 1 to 4). Each has different preferences and current situation.

| Parameter | Parameter for requested trip | Driver 1 | Driver 2 | Driver 3 | Driver 4 |
|---|---|---|---|---|---|
| Customer ID | 1234567 | 0 | 0 | 0 | 0 |
| Pick up point | 100 Miller Street, North Sydney, NSW 2060, Australia | +30 (1 km from pickup) | +20 (2 km from pickup) | +10 (3 km from pickup) | 0 (4 km from pickup) |
| Destination | Sydney International Airport | +30 (preferred destination) | +20 (within 3 km from preferred destination) | 0 (no correlation existing) | 0 (no correlation existing) |
| Distance | 13.2 km | +30 (within 15 km preselected ride range) | +20 (within 20 km preselected ride range) | 0 (no preselected ride range) | −20 (outside 10 km preselected ride range) |
| Car Type | No preference selected | 0 | 0 | 0 | 0 |
| Number of Passengers | 1 | | | | |
| Pick Up Time | As soon as possible | 80 (1 km away) | 60 (2 km away) | 40 (3 km away) | 30 (4 km away) |
| Time | 5.45 pm | 0 | 0 | 0 | 0 |
| Weather | Sunny | 0 | 0 | 0 | 0 |
| Peak Hour? | Yes | −100 | −100 | −100 | −100 |
| Number of Local Vendors | 5 | | | | |
| Number of Local Requesting Customers | 2 | | | | |
| Local Supply/Demand | Over supply | −40 | −40 | −40 | −40 |
| Vehicle type | | 80 (luxury) | 60 (SUV) | 20 (taxi) | 0 (standard) |
| Within preferred hours for shift? | | 80 (just started) | 40 (middle of shift) | 40 (middle of shift) | −20 (shift about to end) |
| Within gross revenue boundaries? | | 100 (outside scope of | 50 (just outside scope of | 0 (gross revenue not selected) | −30 (within scope of gross |

-continued

| Parameter | Parameter for requested trip | Driver 1 | Driver 2 | Driver 3 | Driver 4 |
|---|---|---|---|---|---|
| | | gross revenue) | gross revenue) | | revenue) |
| Preferred provider? | | 100 (preferred) | 0 (not preferred) | 0 (not preferred) | 0 (not preferred) |
| Male/female driver? | | 0 (male) | 0 (male) | 0 (male) | 40 (female, but rider male) |
| Driver rating | | 20 (above 75% positive) | 20 (above 75% positive) | 20 (above 75% positive) | 20 (above 75% positive) |

Once the contributions of each of the drivers have been calculated to a vendor score for each driver, the available vendor compatibility scores are collated into an adaptive vendor pricing index.

At 370 the vendor compatibility scores are combined with the customer score index to facilitate the adaptive price management server in order that it may generate a probability of each vendor being selected to provide the customer request at various price points. The adaptive vendor pricing index provides a comparison of the available vendors in order to facilitate the adaptive price management server. The higher the vendor compatibility score the more compatible the vendor is to the customer and the customer request. In a situation where all vendors offer to provide the service at the same price point the vendor with the highest compatibility score is most likely to procure the customer request due to the high relative compatibility of the driver to the customer, and to the customer service request.

The application platform server executes an adaptive pricing algorithm to calculate the probability of each driver being selected for providing the service at different price points. A functional relationship is determined for each driver of the probability of procuring the customer request at different prices.

TABLE 6

Probability of Drivers 1 to 4 procuring the customer request at different prices.

| | | Probability of procuring the ride at different prices (%) | | | |
|---|---|---|---|---|---|
| Driver | Score | $20 | $40 | $60 | $80 |
| 1 | 1430 | 94 | 85 | 55 | 35 |
| 2 | 1170 | 77 | 60 | 48 | 30 |
| 3 | 1010 | 66 | 53 | 40 | 23 |
| 4 | 900 | 61 | 46 | 36 | 18 |

Table 6 shows the probabilities of each driver procuring the ride as calculated by the adaptive price management server associated with Drivers 1-4. As demonstrated in the table the percentage probability of procuring the customer request at different price points is identified for each driver.

In Table 5, Driver 4 has the lowest vendor compatibility score of 900. Driver 3 has a higher vendor compatibility score of 1010. Driver 2 has a higher vendor compatibility score of 1170. Driver 1 has the highest vendor compatibility score of 1430. As discussed above, the vendor compatibility scores indicate the compatibility of the driver to the particular customer and the customer request. A higher driver compatibility score indicates a high likelihood of that driver selected to provide the service at each particular price.

As shown in Table 6. At a price of $80 driver 1 has a 35% chance of procuring the job, driver 2 also has a 30% probability of procuring the job, driver 3 has a 23% chance of procuring the job and driver 4 has a 18% chance of procuring the job. Generally, these low percentages indicate that the price point is considered to be relatively high for that particular customer, and that particular ride. Again, the variation between the percentages of probabilities for the different drivers indicates the compatibility of those drivers to the customer. These percentages indicate that even at the high price point, there is a 35% chance that the customer will select driver 1 since it has a relatively high compatibility. The low compatibility of driver 4 along with the relatively high price point result in the probability of driver 4 procuring the customer request at $80 being low at 18%.

At a price of $60 driver 1 has a percentage likelihood of procuring the job of 55%, driver 2 has a percentage of 48%, driver 3 has a potential of 40% and driver 4 has a percentage probability of 36%. The generally higher percentages are an indication that the $60 price is more acceptable to the customer but is only significant for drivers with a higher compatibility score. Despite the lower price of $60 there is still a low probability of 36% that the customer will select driver 4 due to the low compatibility score. However, the lower price of $60 could be relatively more acceptable to the customer for driver 1 due to the high compatibility between driver 1 and the customer and customer request.

At $40, the percentage probabilities for all drivers are increased again. Driver 1 has a percentage probability of 85% of procuring the ride, driver 2 has a percentage probability of 60% of procuring the ride, driver 3 has the percentage probability of 53% of procuring the ride and driver 4 has a percentage probability of 46% of procuring the ride. Again, as the cost of the ride is reduced the probability of procuring the ride is increased for all drivers. In line with the previous price points the relative probability of procuring the ride is increased with the increased compatibility scores of the drivers.

Finally, at a price of $20 the percentage probabilities of procuring the ride are increased again. At a $20 price, driver 1 has a probability of 94% of procuring the ride, driver 2 has a probability of 77% of procuring the ride, driver 3 has a probability of 66% of procuring the ride, and driver 4 has a probability of 61% of procuring the ride.

The functional algorithm generated for each driver covers all prices however only particular prices are illustrated in Table 6.

The percentage probabilities at different prices are transmitted to each driver. In the current example, three prices are transmitted to each driver along with the relevant probabilities of procuring the ride at each price. In further embodiments fewer or more prices and probabilities may be presented to each driver. The prices and probabilities are displayed to the driver along with basic trip details. In the present example basic trip details are transmitted to the vendor. Specific details of the trip are not transmitted to the vendor at this stage. However, in further embodiments less specific, or more specific details may be transmitted, depending on the service type and the information required by the vendor to inform themselves in selecting the appropriate price point.

In another embodiment, or further to the above embodiment, a driver may be provided an option to input the price they view the ride as being worth. Any price that is inputted would be calculated by the pricing algorithm to allot the probability that the ride would be procured. As a default, the server will display a price that is in the probability of procurement range of, for instance 70-99%. The driver may increase or decrease this price, and the probability of procurement will update accordingly.

In the above embodiment, the offers received from the vendors are subsequently stored in databases associated with the vendor. This information is stored to monitor vendor behaviour, and used for consideration in future transactions. At 385, this is demonstrated by the subsequent use of offer prices selected in determining the Vendor Compatibility Score for the next service request, creating an ongoing feedback loop. This attribute of the Vendor Compatibility Score is not included above as the offer prices outlined above are the first received by the vendors. This attribute will work in like way to those above, with a positive or negative number that has bearing upon the total score.

In the above embodiment, the customer chooses driver 1, at the price of $40, and this selection is then subsequently stored in databases associated with the customer. This information is stored to monitor customer behaviour, and used for consideration in future transactions. At 395, this is demonstrated by the subsequent use of the offer price selected in determining the Customer Score for the next service request, creating an ongoing feedback loop. This attribute of the Customer Score is not included above as the service request outlined above is the first requested by the customer. This attribute will work in like way to those above, with a positive or negative number that has bearing upon the total score.

Figure 4:
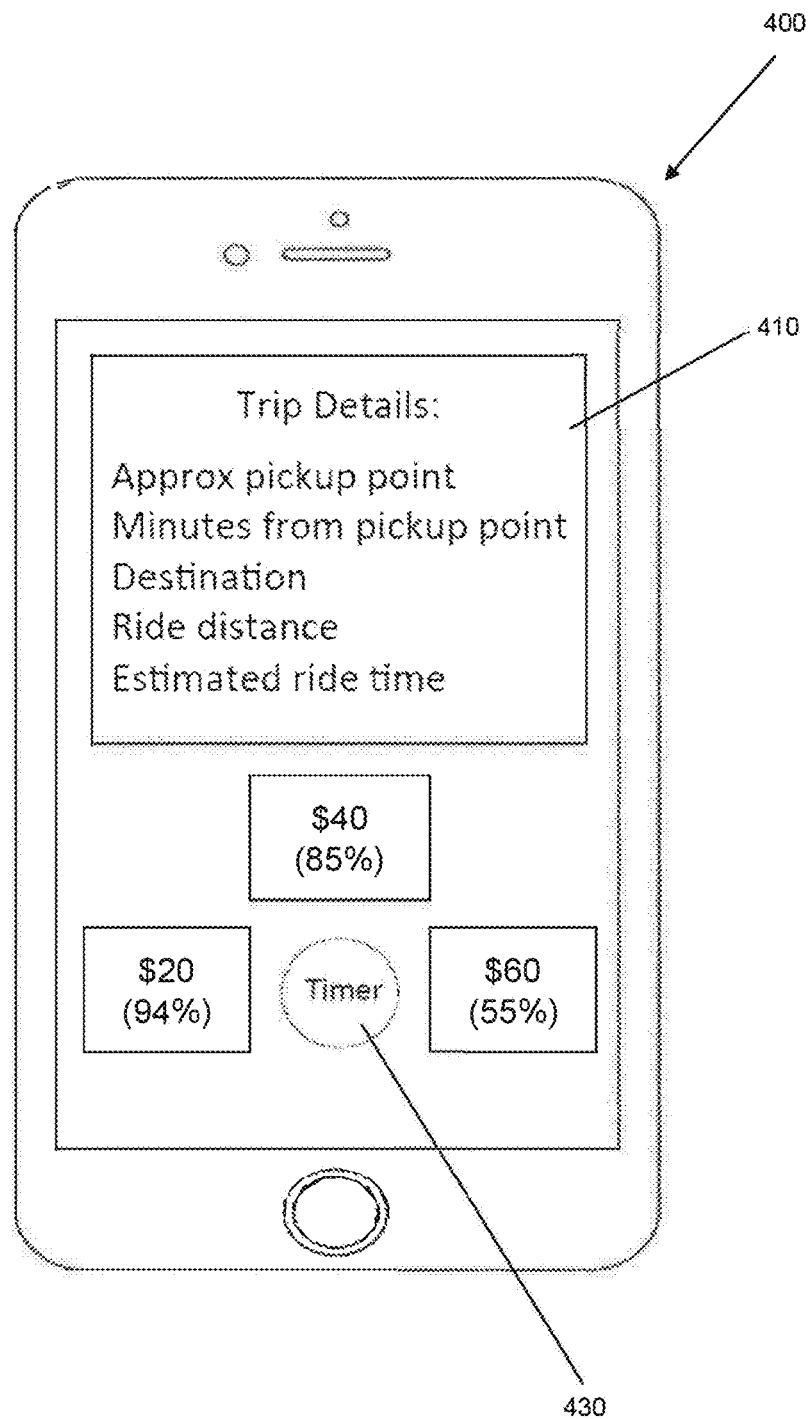
FIG. 4 illustrates options presented to a vendor in an embodiment.

FIG. 4 is an example illustration of presentation of the trip details and presented probabilities provided to a driver, in this case driver 1. In the example of FIG. 4, details are presented on a communication device 400. Trip details 410 include the approximate pick up point of North Sydney, the approximate time taken for the driver to arrive at the pickup point, the requested destination of the customer along with the calculation of the distance of the ride and estimated ride time. Based on this information the driver is provided with significant details in relation to the requested trip. In further embodiments additional and/or different service request details may be included. The percentage likelihood of procuring the trip is also presented to the driver along with different price points.

In the example of FIG. 4 the prices of $20, $40 and $60 are presented to driver 1 along with the relevant percentage chance of procuring the job of 94%, 85% and 55% respectively. The driver selects whether he wishes to offer any of the presented prices for the job.

The embodiment of FIG. 4 also includes a timer 430. Timer 430 is initiated on presentation of the trip details to the driver. The price offer for conducting the customer request is then transmitted back to the application platform server.

Further embodiments include a further selection option for the driver which includes an opportunity to offer a different price from that presented. In these embodiments the driver enters a price. The price is entered into the functional algorithm associated with that driver for this particular job and the relevant percentage probability is calculated and presented to the driver. The algorithm may be uploaded to the driver device, along with the trip details and selection prices, and calculated on the device, or the price may be transmitted back to the application platform server for calculation, and the percentage returned and displayed to the driver device. For example, in the present example, if driver 2 selected a price of $34 the relevant percentage may be 62%. In a slight variation to this embodiment, the space in which a vendor may propose a price may include a price recommended by the server and existing in the probability of procurement range of, for instance 70-99%, which the vendor may increase or decrease in accordance with their preferences, and which will cause the probability to increase or decrease accordingly.

Upon receipt of multiple offers from various vendors, the offers are collated by the application platform server and presented to the customer. The customer may accept one of the offers. The application platform server notifies each of the drivers as to whether they have procured the ride. The successful driver is then provided with full pickup and trip details.

Embodiments of the invention create an ecosystem where a vendor device, through assurance of the requesting device posts they are accepting, can adapt a work/life balance. Certainty is thereby achieved by way of a real correlation between the vendor determined value of the ride post, and the real time circumstances of the vendor, using the ride post attributes made known to the vendor before the vendor has made an offer to carry out the ride. Customers are also given certainty in the cost of each ride request they take, and the car and driver associated with such ride request.

Vendors are enabled to choose a value for each ride post. This value would be less than had the vendor not been targeted, as it is within their designated, predetermined preferences, and they are privy to the likelihood they will procure the ride post. Following from this, the requesting device will be offered a ride post that will often be more cost effective than would otherwise be the case.

The customer is thereby offered choices where none otherwise existed. This is done by way of presenting to the requesting device the provider device determined valuation of each provider that expressed interest in the job by selecting a value. The requesting device and provider device alike are thereby given actual choice, rather than being presented with only one alternative as in the current market.

It will be clear to those skilled in the art that embodiments of the invention can be applied to multiple applications and service industries.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method for notifying a vendor of a customer request comprising:

receiving, by an application platform server, a customer request for supply of a service by any one of a plurality of vendors, each one of the plurality of vendors being a service supplier enabled to make an offer, via a vendor device in data communication with the application platform server via a communication network, to supply a service subject of the customer request, the customer request being transmitted by a customer device to the application platform server over the communication network, the customer request including customer identification data, geolocation data and at least one customer request criteria;

responsive to receiving the customer request, retrieving customer information from a database by the application platform server based on the customer identification data;

identifying automatically by the application platform server a set of vendors suitable for providing the customer request from the plurality of vendors based on geolocation of the vendor device relative to the customer device and one or more criteria of the at least one customer request criteria;

retrieving, by the application platform server, vendor information for each of the set of vendors from the database;

for each of the set of vendors, the application platform server calculating a vendor compatibility score using the vendor information retrieved from the database, the vendor compatibility score being dependent on a compatibility of the vendor to the customer request based on one or more customer request criteria from the customer request, the customer information, and the vendor information;

for each one of a subset of the set of vendors, the subset selected based on vendor compatibility score, generating an adaptive vendor pricing index based on the vendor compatibility score for each of the set of vendors, the customer request information and the retrieved customer information, which is used to determine an estimate of a probability of the vendor being selected to provide the customer request at each of at least one customer request reference price, wherein the probability of a vendor being selected is based at least in part on a customer score index, the customer score index being calculated based on a combination of a customer score and the customer information, and wherein the customer score is generated for the customer request based on the customer request criteria, system capabilities, and real time market metrics;

transmitting, by the application platform server via the communication network, summary data of the customer request to the vendor device of each one of the subset of the set of vendors, wherein the summary data of the customer request, transmitted to the vendor device of each one of the subset of the set of vendors, triggers operation of a timer on the vendor device of each one of the subset of the set of vendors for responding to the customer request, and includes at least one customer request reference price, and the probability of the vendor being selected to provide the customer request at the at least one customer request reference price;

responsive to receiving by the application platform server one or more offers transmitted by the vendor device of each one of the subset of the set of vendors, transmitting to the customer device at least one offer price and vendor information relevant to the customer request; and responsive to receiving by the application platform server an acceptance of one offer transmitted by the customer device, transmitting an indication of acceptance of the offer to the vendor device.

2. A method according to claim 1 wherein generating a customer score is based on system generated capabilities which include correlation between variables the application server has deduced from past customer requests using machine learning as relevant in general for future customer requests for supply of a service without personal references to vendors or customers, and wherein generating an adaptive pricing algorithm is-using the customer score index.

3. A method according to claim 2 wherein the customer information includes at least one of:
preselected customer criteria associated with the customer, preselected customer criteria comprising customer preferences, and previous behaviours of the customer.

4. A method according to claim 2 wherein the vendor information includes at least one of:
preselected vendor criteria associated with the vendor, the preselected vendor criteria comprising vendor preferences, and previous behaviours of the vendor.

5. A method according to claim 2 further comprising determining real time market metrics.

6. A method according to claim 5 wherein real time market metrics comprises at least one of a comparison between supply and demand at the time of the customer request, geographical location of the customer request and at least one standard reference price.

7. A method according to claim 2 wherein the vendor compatibility score is determined using at least one of:
customer request information;
system generated capabilities;
market metrics; and
the vendor information.

8. A method according to claim 2 wherein generating the adaptive vendor pricing index is performed in dependence on a comparison of multiple vendor compatibility scores for the customer request.

9. A method according to claim 2 wherein the vendor is a suitable vendor if the vendor device of the vendor is located within at least one of: a predefined distance from the customer device, or distance from a service location defined in the customer request, at time of receiving the customer request.

10. A method according to claim 2 wherein the probability of the vendor being selected is a percentage probability.

11. A method according to claim 2 wherein receiving at least one offer transmitted from a vendor device comprises receiving a price from at least one vendor, the offer price comprising the customer request reference price selected by the vendor at which the vendor will provide the customer request.

12. An apparatus for notifying a vendor of a customer request comprising:
a communication network receiver configured to receive, from a customer device via a communication network, a customer request for supply of a service which may be provided by any one of a plurality of vendors, each one of the plurality of vendors being a service supplier enabled to make an offer, via a vendor device in data communication with an application platform server via the communication network, to supply a service subject of the customer request, the customer request including customer identification data, geolocation data and at least one customer request criteria;

an application platform server including a processor configured to:

responsive to receiving the customer request retrieve customer information from a database based on the received customer identification data;

identify automatically a set of vendors suitable for providing the customer request from the plurality of vendors based geolocation of the vendor device relative to the customer device, and on one or more criteria of the customer request criteria;

retrieve vendor information for the set of vendors from the database;

for each of the set of vendors, determining a vendor compatibility score, the vendor compatibility score being dependent on the compatibility of the vendor to the customer request based on one or more customer request criterion from the customer request, customer information and vendor information;

for each of one of a subset of the set of vendors, the subset selected based on vendor compatibility score, generating an adaptive vendor pricing index based on the vendor compatibility scores, the customer request information and the retrieved customer information, which is used to determine an estimate a probability of the vendor being selected to provide the customer request at each one of at least one customer request reference price; and a transmitter configured to transmit summary data of the customer request to the vendor device of each one of the subset of the set of vendors via the communication network, wherein the customer request, provided to the vendor device of each one of the subset of vendors triggers operation of a timer on the vendor device of each one of the subset of vendors for responding to the customer request, and includes at least one customer request reference price, and the probability of the vendor being selected to provide the customer request at the customer request reference price, the probability of a vendor being selected is based at least in part on a customer score index, the customer score index being calculated based on a combination of a customer score and the customer information, and wherein the customer score is generated for the customer request based on the customer request criteria, system capabilities, and real time market metrics, wherein the communication network receiver also receives one or more offers transmitted by the vendor devices, and the platform server, wherein the transmitter also transmits to the customer device at least one offer price and vendor information relevant to the customer request wherein the communication network receiver further receiving and providing to the processor any acceptance of offers transmitted by customer devices; and wherein responsive to receiving by the platform server an acceptance of one offer transmitted by the customer device, the processor transmits via the transmitter an indication of acceptance of the offer to the vendor device of the accepted offer.

13. An apparatus according to claim 12, the processor further generating a customer score based on system generated capabilities which include correlation between variables the application server has deduced from past customer requests using machine learning as relevant in general for future customer requests for supply of a service without personal references to vendors or customers, and wherein generating an adaptive pricing algorithm is performed using the customer score index.

14. An apparatus according to claim 13 the processor further determining real time market metrics, the real time market metrics comprising at least one of a comparison between supply and demand at the time of the customer request, geographical location of the customer request, and at least one standard reference price.

15. An apparatus according to claim 13 wherein the step of generating the adaptive vendor pricing index is performed in dependence on a comparison of multiple vendor compatibility scores for the customer request.

16. An apparatus according to claim 13 wherein the vendor is a suitable vendor if it is located within at least one of: a predefined distance from the customer, or distance from a service location defined in the customer request, at the time of receiving the customer request.

17. An apparatus according to claim 13 wherein the communication network receiver receives at least one offer price from the at least one vendor, the offer price comprising the customer request reference price selected by the vendor at which the vendor will provide the customer request.

* * * * *